United States Patent [19]
Sawamura et al.

[11] 4,264,131
[45] Apr. 28, 1981

[54] OPTICAL FIBER OF HIGH DURABILITY PREPARED FROM MULTICOMPONENT GLASS

[75] Inventors: Kunihide Sawamura, Yokohama; Mituo Kasori, Kawasaki; Takeshi Takano, Samukawa; Hironori Maki, Kawasaki, all of Japan

[73] Assignee: Tokyo Shibaura Denki Kabushiki Kaisha, Kawasaki, Japan

[21] Appl. No.: 37,164

[22] Filed: May 8, 1979

[30] Foreign Application Priority Data

May 16, 1978 [JP] Japan ................... 53/57114

[51] Int. Cl.³ ............................................. G02B 5/14
[52] U.S. Cl. ............................. 350/96.34; 106/47 Q; 106/50
[58] Field of Search ................ 350/96.30, 96.34; 65/2, 65/3 R, 3 A; 106/47 R, 47 Q, 50

[56] References Cited

U.S. PATENT DOCUMENTS

| | | | |
|---|---|---|---|
| 3,013,888 | 12/1961 | Lajarte | 106/50 |
| 3,841,882 | 10/1974 | Wolf | 106/50 |
| 3,844,801 | 10/1974 | Wolf | 106/50 |

FOREIGN PATENT DOCUMENTS

48-17814  6/1973  Japan.
51-14915  5/1976  Japan.

OTHER PUBLICATIONS

Takahashi et al., "Soda-Lime-Silica Glass for Optical Fiber", *Tenth Int'l. Congress on Glass*, (Japan), Jul. 1974, pp. 6-64 to 6-69.

*Primary Examiner*—John K. Corbin
*Assistant Examiner*—John D. Lee
*Attorney, Agent, or Firm*—Oblon, Fisher, Spivak, McClelland & Maier.

[57] ABSTRACT

An optical fiber which consists of a multicomponent core glass member which is formed of $SiO_2$, $Al_2O_3$ and an alkali metal oxide and preferably contains CaO, MgO and $B_2O_3$; and a multicomponent cladding glass member which is prepared from $SiO_2$, $Al_2O_3$, an alkali metal oxide and at least one component selected from the group consisting of ZnO, $ZrO_2$ and $TiO_2$, and preferably contains CaO, MgO and $B_2O_3$; and consequently reduces transmission loss of light and exhibits prominent durability.

3 Claims, No Drawings

OPTICAL FIBER OF HIGH DURABILITY PREPARED FROM MULTICOMPONENT GLASS

BACKGROUND OF THE INVENTION

This invention relates to a step-index type optical fiber for optical communication which is prepared from multicomponent glass.

This optical fiber is formed of core glass and cladding glass having a smaller refractive index than the core glass. Optical communication glass fiber is designed to conduct light information from one end to the other in a state completely enclosed in the core glass by utilizing the total reflection of light at the boundary between the core glass and cladding glass.

The above-mentioned type of optical fiber is demanded to meet the requirements listed below:
(1) Fiber, particularly cladding glass should have a high resistance to chemicals, such as water, acids, alkalis, and a high resistance to weathering, in other words, high durability.
(2) Neither core glass nor cladding glass should crystallize during manufacture. This requirement is indispensable.
(3) The core glass should minimize loss of light transmitted therethrough. Transmission loss of light should be smaller than 20 dB/km as measured from the whole fiber. Where fiber glass has a high melting point, impurities tend to be carried into the glass from, for example, a crucible. As a result, scattering of light undesirably arises in such defective glass, leading to higher transmission loss of light.
(4) The core glass should have a thermal expansion coefficient larger than that of the cladding glass by a difference $\Delta\alpha$ of less than $3\times10^{-6}$ cm/cm °C. (at 0° to 300° C.). Where both thermal expansion coefficients have an unduly large difference, then the resultant fiber glass will decrease in reliability.
(5) The core glass should have a refractive index ($n_1$) larger than that of the cladding glass ($n_2$) by a larger ratio $\Delta n$ ($=n_1-n_2/n_1$) than 0.003.

Improvement on the known optical fiber has been primarily intended to decrease loss of light transmitted therethrough. It is reported that an optical fiber has been developed in which transmission loss of light is of the order of about 5 dB/km. Though favored by a small transmission loss of light, the optical fiber developed to date has the drawback that it is unsatisfactory in respect of resistance to chemicals and weathering. An optical fiber is generally demanded to have a long effective life. However, the above-mentioned prior art optical fiber, though improved in transmission loss of light, has insufficient durability and consequently low reliability, failing to be put into practical application.

A known multicomponent optical fiber favored by a low transmission loss of light is formed of a core glass member prepared from 20% by weight of $Na_2O$, 9% by weight of CaO and 71% by weight of $SiO_2$ and a cladding glass member prepared from 22% by weight of $Na_2O$, 3.5% by weight of CaO and 74.5% by weight of $SiO_2$. Though appreciably reduced in transmission loss of light, this optical fiber, particularly, the cladding glass member thereof contains a large amount of alkali. This alkali component tends to exude to the surface of the fiber and decrease its durability.

A step-index type optical fiber is generally manufactured by causing molten core glass and cladding glass simultaneously to flow downward respectively through the bottom openings of the inner and outer unit crucibles constituting a double crucible assembly, and later drawing both falling glass materials into a fine fibrous form. These core and cladding glass materials are preferred to have a viscosity ranging from $10^5$ to $10^3$ poises during the rundown through the bottom opening and subsequent drawing in the fibrous form. If the glass material crystallizes during the fibrous drawing, it gives rise to increased transmission loss of light and decreased tensile strength. Therefore, it is an indispensable requirement for the glass material to be saved from crystallization during the fibrous drawing.

SUMMARY OF THE INVENTION

It is accordingly an object of this invention to provide an optical fiber capable of meeting all the aforesaid requirements.

Another object of the invention is to provide an optical fiber characterized by small transmission loss of light and high durability.

To attain the above-mentioned objects, this invention provides an optical fiber, whose core glass member is prepared from 50 to 80% by weight or preferably 60 to 80% by weight of $SiO_2$, 0.5 to 7% by weight of $Al_2O_3$, 10 to 23% by weight of an alkali metal oxide, 0 to 10% by weight of CaO, 0 to 5% by weight of MgO and 0 to 15% by weight of $B_2O_3$; and whose cladding member is formed of 60 to 80% by weight of $SiO_2$, 0.5 to 10% weight of $Al_2O_3$, 9 to 17% weight of an alkali metal oxide, 0 to 5% by weight of CaO, 0 to 4% by weight of MgO, 0 to 15% by weight of $B_2O_3$ and 7% by weight or less of at least one component selected from the group consisting of ZnO, $ZrO_2$ and $TiO_2$.

An optical fiber according to a preferred embodiment of this invention consists of a core glass member prepared from 65 to 75% by weight of $SiO_2$, 1 to 6% by weight of $Al_2O_3$, 12 to 21% by weight of an alkali metal oxide, 2 to 10% by weight of CaO and 1 to 5% by weight of MgO; and a cladding glass member formed of 65 to 75% by weight of $SiO_2$, 2 to 8% by weight of $Al_2O_3$, 9 to 16% by weight of an alkali metal oxide, 0 to 5% by weight of CaO, 0 to 3% by weight of MgO, 1 to 12% by weight of $B_2O_3$ and 0.5 to 3% by weight of at least one component selected from the group consisting of ZnO, $ZrO_2$ and $TiO_2$.

An optical fiber according to a more preferred embodiment of this invention consists of a core glass member prepared from 55 to 70% by weight of $SiO_2$, 1 to 6% by weight of $Al_2O_3$, 14 to 21% by weight of an alkali metal oxide, 2 to 8% by weight of CaO, 1 to 4% by weight of MgO and 3 to 12% by weight of $B_2O_3$; and a cladding glass member formed of 65 to 75% by weight of $SiO_2$, 2 to 8% by weight of $Al_2O_3$, 9 to 16% by weight of an alkali metal oxide, 0 to 5% by weight of CaO, 0 to 3% by weight of MgO, 1 to 12% by weight of $B_2O_3$ and 0.5 to 3% by weight of at least one component selected from the group consisting of ZnO, $ZrO_2$ and $TiO_2$.

DETAILED DESCRIPTION OF THE INVENTION

For the core glass member of this invention, $SiO_2$, $Al_2O_3$ and alkali metal oxide are indispensable ingredients. An optical fiber embodying this invention meets the requirements to minimize scattering of light and transmission loss of light and is also improved in resistance to chemicals due to the addition of a proper amount of $Al_2O_3$. CaO, MgO and $B_2O_3$ may be omitted from the core glass member.

There will now be described the chemical composition of a core glass member included in an optical fiber embodying this invention.

(1) $SiO_2$ is a network former of fiber glass. Where the content of $SiO_2$ falls below 50% by weight, the resultant glass decreases in resistance to water. Where the content of $SiO_2$ rises above 80% by weight, the resultant glass fails to have a desired large refractive index. For elevation of resistance to water, it is preferred to use more than 60% by weight of $SiO_2$. Part of $SiO_2$ may be replaced by $GeO_2$ to control the viscosity of a core glass member at a temperature of fibrous drawing. In this case, however, the content of $GeO_2$ is restricted to 30% at maximum (at this time the content of $SiO_2$ ranges between 20 and 50% by weight). Where the content of $GeO_2$ increases over said maximum level, the viscosity of the core glass at a temperature of fibrous drawing excessively falls, presenting difficulties in the fibrous drawing of the resultant core glass.

(29 $Al_2O_3$ is an important ingredient to elevate the water resistance of glass and minimize its tendency toward crystallization. A smaller content of $Al_2O_3$ than 0.5% by weight can not provide glass having a high resistance to water and a small tendency toward crystallization. Where, however, the content of $Al_2O_3$ exceeds 7% by weight, then the core glass is ready to crystallize during the fibrous drawing. The content of $Al_2O$ in the core glass member is preferred to range between 1 and 6% by weight.

(3) Alkali metal oxides used with an optical fiber embodying this invention chiefly include $Na_2O$, $K_2O$ and $Li_2O$. It will well serve the purpose, if the glass contains at least one of these components or a mixture thereof. The alkali metal oxide is a glass network modifier. As the alkali metal oxide is used in a larger amount, the resultant glass tends to have a lower resistance to wear. An upper limit to the content of an alkali metal oxide in the core glass is chosen to be 23% by weight. Where, however, the content of an alkali metal oxide falls below 10% by weight, then the core glass tends to crystallize during the fibrous drawing. Therefore, the content of an alkali metal oxide in the core glass is preferred to range between 12% and 21% by weight. The percentage of the above mentioned $Na_2O$, $K_2O$ and $Li_2O$ can be properly adjusted within said range, depending on the property demanded of the core glass.

Where it is desired to decrease, for example, the viscosity of the core glass at a temperature of fibrous drawing, it is advised to reduce the percentage of $K_2O$. Where the core glass is desired to have a higher thermal expansion coefficient, then $Li_2O$ is applied in a larger amount. Where the core glass is desired to have a higher refractive index, then $Li_2O$ is applied similarly in an increased percentage.

(4) CaO contributes to the elevation of the water resistance and refractive index of glass. Where, however, CaO is contained in a larger amount than 10% by weight, the resultant glass is likely to crystallize. The content of CaO in the core glass is preferred to range between 2 and 10% by weight.

(5) MgO restricts the occurrence of haze in glass resulting from exudation of alkali components, and consequently improves resistance to weathering. Where, however, the content of MgO increases over 5% by weight, the resultant glass is ready to crystallize. The content of MgO in the core glass is preferred to range from 1 to 5% by weight.

(6) $B_2O_3$ is effective to prevent glass from crystallization and decreasing in viscosity at high temperature. Where, however, the content of $B_2O_3$ increases over 15% by weight, the resultant glass unduly drops in viscosity at a temperature of fibrous drawing, presenting difficulties in carrying out said fibrous drawing. Where the content of $B_2O_3$ in the core glass favorably ranges between 3 and 12% by weight, then the resultant core glass is saved from crystallization, making it possible to manufacture an optical fiber with a high reproducibility.

For the cladding glass member of this invention, it is indispensable to use $SiO_2$, $Al_2O_3$, alkali metal oxide and at least one component selected from the group consisting of ZnO, $ZrO_2$ and $TiO_2$. It is possible to omit CaO, MgO and $B_2O_3$. To let the cladding glass member have a higher durability than the core glass member, the content of an alkali metal oxide is more restricted. Further, the cladding glass member is made to contain $Al_2O_3$ and at least one component selected from the group consisting of ZnO, $ZrO_2$ and $TiO_2$.

There will now be described the respective ingredients of the cladding glass member.

(1) $SiO_2$ is network former of fiber glass. Where the content of $SiO_2$ falls below 60% by weight, then the resultant cladding glass decreases in resistance to water. Where the content of $SiO_2$ rises above 80% by weight, then the resultant cladding glass has an increased viscosity at high temperature, undesirably showing a larger viscosity difference between the core glass and the cladding glass. The content of $SiO_2$ in the cladding glass is preferred to range between 65 and 75% by weight.

(2) $Al_2O_3$ is effective to elevate the water resistance of the cladding glass and minimize its tendency toward crystallization. Where $Al_2O_3$ is applied in a smaller amount than 0.5% by weight, the resultant cladding glass fails to have a satisfactory property. Conversely, where the content of $Al_2O_3$ exceeds 10% by weight, then the resultant cladding glass tends to crystallize during the fibrous drawing. The content of $Al_2O_3$ in the cladding glass is preferred to range between 2 and 8% by weight.

(3) Alkali metal oxides chiefly include $Na_2O$, $K_2O$ and $Li_2O$. It will well serve the purpose, if the cladding glass contains at least one of these components, or a mixture thereof. Since the cladding glass is demanded to have a higher durability than the core glass, the content of an alkali metal oxide in the cladding glass is controlled to be smaller than when applied in the core glass. It has been discovered that where the content of an alkali metal oxide rises above 17% by weight, the resultant cladding glass fails to have a sufficient resistance to water, and that where said content falls below 9% by weight, the resultant cladding glass is ready to crystallize during the fibrous drawing. The content of an alkali metal oxide is preferred to range between 9 and 16% by weight.

(4) CaO contributed to the elevation of the water resistance of the cladding glass. Where, however, CaO is used in a larger amount than 5% by weight, then the resultant cladding glass is likely to crystallize.

(5) MgO is effective to suppress the occurrence of haze in the cladding glass and elevate its resistance to weathering. Where, however, the content MgO increases over 4% by weight, the resultant cladding glass is ready to crystallize. The content of MgO in the cladding glass is preferred to range between 0 and 3% by weight.

(6) $B_2O_3$ contributes to the elevation of water resistance of the cladding glass and its refractive index. Where, however, the content of $B_2O_3$ exceeds 15% by weight, then the resulting cladding glass has too high a refractive index.

The content of $B_2O_3$ is preferred to range between 1 and 12% by weight.

(7) Even a minute amount of ZnO, $ZrO_2$ and $TiO_2$ is very effective to increase the water resistance of the cladding glass. Where, however, the content of any of these components increases over 7%, then striae tend to be grown in the resultant cladding glass. The content of any of said oxides favorably falling within the range of 0.5 to 3% by weight is sufficiently effective to increase the water resistance of the resultant cladding glass.

An optical fiber embodying this invention can be manufactured by the ordinary spinning process such as the double crucible process, and rod-in-tube process. For example, where core glass and cladding glass are simultaneously drawn in the fibrous form by the double crucible process with temperature controlled to a level falling within the range of 800° to 1100° C. to ensure the proper viscosity of both glass materials, then it is possible to prepare an optical fiber from multicomponent glass, whose core glass member has a diameter of 80 microns and whose cladding glass member has a diameter of 150 microns.

There are shown in the following table some concrete examples of the compositions of core glass and cladding glass constituting optical fibers embodying this invention and those falling outside of the scope of the invention, and also the properties of the core glass members and cladding glass members. Resistance to water, resistance to weathering and tendency toward loss of transparence given in the following table were determined by the undermentioned tests.

(1) Resistance to water 5.0 g of the respective powder samples of the core and cladding glass materials which passed through the standard JIS (Japanese Industrial Standards) screen having 0.5 mm meshes but did not pass through the standard JIS screen having 0.3 mm meshes were dipped in distilled water of 100 ml. Each sample was heated one hour in a bath of boiling distilled water. Thereafter the distilled water was titrated with a 0.01 N HCl solution. An amount (ml) of the 0.01 N HCl solution required for titration is given in the row of the following table showing resistance to wear. With the prior art optical fiber prepared from multicomponent glass, even the cladding glass member which was demanded to have good resistance to wear gave rise to the prominent exudation of an alkali metal. Therefore, the above-mentioned 0.01 N HCl titration solution was used in as large an amount as scores of milliliters.

(2) Resistance to weathering

Haze produced on the surface of tested glass samples was measured by a hazemeter. Comparison was made between the tested glass samples and a standard optical glass specimen SK-16 with respect to the development of haze. The haze conditions of the tested glass samples were indicated by the following equation marks.

| | |
|---|---|
| Less liable to develop haze than SK-16 | A |
| As ready to produce haze as SK-16 | AB |
| More likely to develop haze than SK-16 | B |

(3) Tendency toward crystallization

The tendency of tested glass samples toward crystallization was observed when heated 15 hours in an oven at 800° C. and also when heated 15 hours in an oven at 1100° C. The tendencies of the tested glass samples were indicated by the following evaluation marks.

| | |
|---|---|
| Completely saved from crystallization | a |
| Liable to indicate crystallization on the surface | b |
| Tendensy to show crystallization on the outside and in the inside | c |

Since complete freedom from crystallization is an indispensable requirement for an optical fiber, the tested glass samples whose tendency toward crystallization was indicated by the other evaluation marks than the above-mentioned mark a were considered as falling outside of the scope of this invention. An optical fiber prepared from the glass sample indicated by the evaluation mark a did not crystallize.

| | Example 1 | | Example 2 | |
|---|---|---|---|---|
| Composition and Properties | Core glass | Cladding glass | Core glass | Cladding glass |
| $SiO_2$ (wt %) | 78.5 | 79.5 | 77 | 78.0 |
| $GeO_2$ (wt %) | — | — | — | — |
| $Al_2O_3$ (wt %) | 0.5 | 0.5 | 3 | 2.0 |
| $Na_2O$ (wt %) | 8 | 10 | 13 | 10 |
| $Li_2O$ (wt %) | 8 | 2 | 7 | 4 |
| $K_2O$ (wt %) | 5 | 4 | — | 3 |
| CaO (wt %) | — | — | — | — |
| MgO (wt %) | — | — | — | — |
| $B_2O_3$ (wt %) | — | — | — | — |
| ZnO (wt %) | — | 2 | — | 2 |
| $ZrO_2$ (wt %) | — | 1 | — | 1 |
| $TiO_2$ (wt %) | — | 1 | — | — |
| Refractive index n | 1.5170 | 1.5110 | 1.5170 | 1.5120 |
| Thermal expansion coefficient ($\alpha \times 10^{-7}$) | 110 | 95 | 111 | 100 |
| Resistance to water (ml) | 24.5 | 2.8 | 24.3 | 4.1 |
| Resistance to weathering | AB | AB | AB | AB |
| Temperature (°C.) for viscosity of $10^4$ poises | 930 | 1046 | 910 | 1043 |
| Temperature (°C.) for viscosity of $10^5$ poises | 821 | 903 | 801 | 899 |
| Temperature (°C.) for viscosity of $10^6$ poises | 732 | 793 | 708 | 789 |
| Tendency toward crystallization (800° C., 15hr) | a | a | a | a |
| Tendency toward crystallization (1100° C., 15hr) | a | a | a | a |

| | Example 3 | | Example 4 | |
|---|---|---|---|---|
| Composition and Properties | Core glass | Cladding glass | Core glass | Cladding glass |
| $SiO_2$ (wt %) | 77 | 78.5 | 77 | 78 |
| $GeO_2$ (wt %) | — | — | — | — |
| $Al_2O_3$ (wt %) | 3 | 5 | 3 | 3 |
| $Na_2O$ (wt %) | 13 | 10 | 13 | 12 |
| $Li_2O$ (wt %) | 7 | 3 | 7 | 4 |
| $K_2O$ (wt %) | — | 3 | — | — |

|  | -continued | | | |
|---|---|---|---|---|
| CaO (wt %) | — | — | — | — |
| MgO (wt %) | — | — | — | — |
| $B_2O_3$ (wt %) | — | — | — | — |
| ZnO (wt %) | — | — | — | 2 |
| $ZrO_2$ (wt %) | — | 0.5 | — | 1 |
| $TiO_2$ (wt %) | — | — | — | — |
| Refractive index n | 1.5170 | 1.5040 | 1.5170 | 1.5110 |
| Thermal expansion coefficient ($\alpha \times 10^{-7}$) | 111 | 97 | 111 | 98 |
| Resistance to water (ml) | 24.3 | 4.3 | 24.3 | 1.5 |
| Resistance to weathering | AB | AB | AB | AB |
| Temperature (°C.) for viscosity of $10^4$ poises | 910 | 1056 | 910 | 1027 |
| Temperature (°C.) for viscosity of $10^5$ poises | 801 | 915 | 801 | 878 |
| Temperature (°C.) for viscosity of $10^6$ poises | 708 | 809 | 708 | 770 |
| Tendency toward crystallization (800° C., 15hr) | a | a | a | a |
| Tendency toward crystallization (1100° C., 15hr) | a | a | a | a |

|  | Example | | | |
|---|---|---|---|---|
|  | Example 5 | | Example 6 | |
| Composition and Properties | Core glass | Cladding glass | Core glass | Cladding glass |
| $SiO_2$ (wt %) | 76 | 78.5 | 74 | 72.5 |
| $GeO_2$ (wt %) | — | — | — | — |
| $Al_2O_3$ (wt %) | 2 | 6 | 2 | 5 |
| $Na_2O$ (wt %) | 3 | 6 | 10 | 7.5 |
| $Li_2O$ (wt %) | 7 | 3 | 3 | 3 |
| $K_2O$ (wt %) | 2 | — | 2 | 5 |
| CaO (wt %) | 6 | 5 | 6 | 3 |
| MgO (wt %) | 4 | — | 3 | 2 |
| $B_2O_3$ (wt %) | — | — | — | — |
| ZnO (wt %) | — | 1 | — | 2.0 |
| $ZrO_2$ (wt %) | — | — | — | — |
| $TiO_2$ (wt %) | — | 0.5 | — | — |
| Refractive index n | 1.5149 | 1.4998 | 1.5139 | 1.5070 |
| Thermal expansion coefficient ($\alpha \times 10^{-7}$) | 101 | 92 | 101 | 93 |
| Resistance to water (ml) | 0.8 | 0.1 | 1.9 | 0.7 |
| Resistance to weathering | A | AB | A | A |
| Temperature (°C.) for viscosity of $10^4$ poises | 1081 | 1180 | 1038 | 1051 |
| Temperature (°C.) for viscosity of $10^5$ poises | 941 | 1041 | 904 | 912 |
| Temperature (°C.) for viscosity of $10^6$ poises | 834 | 932 | 799 | 798 |
| Tendency toward crystallization (800° C., 15hr) | a | a | a | a |
| Tendency toward crystallization (1100° C., 15hr) | a | a | a | a |

|  | Example | | | |
|---|---|---|---|---|
|  | Example 7 | | Example 8 | |
| Composition and Properties | Core glass | Cladding glass | Core glass | Cladding glass |
| $SiO_2$ (wt %) | 77.6 | 72.5 | 61.5 | 65 |
| $GeO_2$ (wt %) | — | — | — | — |
| $Al_2O_3$ (wt %) | 2 | 5 | 6 | 7 |
| $Na_2O$ (wt %) | 6 | 7.5 | 7 | 8 |
| $Li_2O$ (wt %) | 4 | 1 | 7 | 2 |
| $K_2O$ (wt %) | 5 | 7 | 7 | 6 |
| CaO (wt %) | 2.5 | 4 | 8.5 | 4.5 |
| MgO (wt %) | 2.9 | — | 3 | 2 |
| $B_2O_3$ (wt %) | — | 1 | — | 3.5 |
| ZnO (wt %) | — | — | — | 2.0 |
| $ZrO_2$ (wt %) | — | 2 | — | — |
| $TiO_2$ (wt %) | — | — | — | — |
| Refractive index n | 1.5100 | 1.5038 | 1.5318 | 1.5074 |
| Thermal expansion coefficient ($\alpha \times 10^{-7}$) | 99 | 94 | 122 | 101 |
| Resistance to water (ml) | 1.5 | 1.1 | 26.2 | 0.7 |
| Resistance to weathering | A | AB | A | A |
| Temperature (°C.) for viscosity of $10^4$ poises | 1088 | 1087 | 959 | 1049 |
| Temperature (°C.) for viscosity of $10^5$ poises | 944 | 942 | 831 | 904 |
| Temperature (°C.) for viscosity of $10^6$ poises | 821 | 817 | 729 | 788 |
| Tendency toward crystallization (800° C., 15hr) | a | a | a | a |
| Tendency toward crystallization (1100° C., 15hr) | a | a | a | a |

|  | Example | | | |
|---|---|---|---|---|
|  | Example 9 | | Example 10 | |
| Composition and Properties | Core glass | Cladding glass | Core glass | Cladding glass |
| $SiO_2$ (wt %) | 59.5 | 71.5 | 59 | 76.5 |
| $GeO_2$ (wt %) | — | — | — | — |
| $Al_2O_3$ (wt %) | 2 | 5 | 5.5 | 2 |
| $Na_2O$ (wt %) | 14.9 | 7.5 | 9 | 5 |
| $Li_2O$ (wt %) | 2 | 3 | 1 | 2 |
| $K_2O$ (wt %) | 2.7 | 5 | 8 | 9 |
| CaO (wt %) | 6.6 | 3 | 8.5 | 3 |
| MgO (wt %) | 2.5 | 2 | 1 | 1 |
| $B_2O_3$ (wt %) | 9.8 | 2 | 8 | — |
| ZnO (wt %) | — | 1 | — | — |
| $ZrO_2$ (wt %) | — | — | — | 1.5 |
| $TiO_2$ (wt %) | — | — | — | — |
| Refractive index n | 1.5358 | 1.5100 | 1.5432 | 1.5034 |
| Thermal expansion coefficient ($\alpha \times 10^{-7}$) | 110 | 94 | 118 | 96 |
| Resistance to water (ml) | 4.8 | 0.8 | 3.7 | 0.8 |
| Resistance to weathering | A | A | A | A |
| Temperature (°C.) for viscosity of $10^4$ poises | 818 | 990 | 1025 | 1044 |
| Temperature (°C.) for viscosity of $10^5$ poises | 741 | 860 | 884 | 904 |
| Temperature (°C.) for viscosity of $10^6$ poises | 678 | 760 | 761 | 790 |
| Tendency toward crystallization (800° C., 15hr) | a | a | a | a |
| Tendency toward crystallization (1100° C., 15hr) | a | a | a | a |

|  | Example | | | |
|---|---|---|---|---|
|  | Example 11 | | Example 12 | |
| Composition and Properties | Core glass | Cladding glass | Core glass | Cladding glass |
| $SiO_2$ (wt %) | 68 | 65 | 65 | 72.5 |
| $GeO_2$ (wt %) | — | — | — | — |
| $Al_2O_3$ (wt %) | 4.5 | 7 | 2 | 5 |
| $Na_2O$ (wt %) | 8 | 8 | 7 | 7.5 |
| $Li_2O$ (wt %) | — | 2 | 1 | 1 |
| $K_2O$ (wt %) | 10 | 6 | 7 | 7 |
| CaO (wt %) | 5 | 4.5 | 8 | 4 |
| MgO (wt %) | — | 2 | — | — |
| $B_2O_3$ (wt %) | 4.5 | 3.5 | 10 | 1 |
| ZnO (wt %) | — | — | — | — |
| $ZrO_2$ (wt %) | — | — | — | 2 |
| $TiO_2$ (wt %) | — | 2.0 | — | — |
| Refractive index n | 1.5379 | 1.5074 | 1.5331 | 1.5038 |
| Thermal expansion coefficient ($\alpha \times 10^{-7}$) | 102 | 101 | 99 | 94 |
| Resistance to water (ml) | 3.4 | 0.7 | 1.5 | 1.1 |
| Resistance to weathering | AB | A | AB | AB |
| Temperature (°C.) for viscosity of $10^4$ poises | 1033 | 1049 | 1092 | 1087 |
| Temperature (°C.) for viscosity of $10^5$ poises | 891 | 904 | 950 | 942 |
| Temperature (°C.) for viscosity of $10^6$ poises | 773 | 788 | 827 | 817 |
| Tendency toward crystallization (800° C., 15hr) | a | a | a | a |
| Tendency toward crystallization | | | | |

-continued

| Composition and Properties | Example 13 | | Example 14 | |
|---|---|---|---|---|
| | Core glass | Cladding glass | Core glass | Cladding glass |
| SiO$_2$ (wt %) | 64.5 | 66.5 | 65 | 72.5 |
| GeO$_2$ (wt %) | — | — | — | — |
| Al$_2$O$_3$ (wt %) | 5.5 | 7 | 2.0 | 5 |
| Na$_2$O (wt %) | 2 | 6 | 13 | 7.5 |
| Li$_2$O (wt %) | 2 | 4 | 2 | 3 |
| K$_2$O (wt %) | 10 | 3 | 2 | 5 |
| CaO (wt %) | 4 | 4.5 | 8 | 3 |
| MgO (wt %) | 2 | 2 | 1 | 2 |
| B$_2$O$_3$ (wt %) | 10 | 6 | 7 | — |
| ZnO (wt %) | — | — | — | 2 |
| ZrO$_2$ (wt %) | — | — | — | — |
| TiO$_2$ (wt %) | — | 1 | — | — |
| Refractive index n | 1.5330 | 1.5070 | 1.5416 | 1.5070 |
| Thermal expansion coefficient ($\alpha \times 10^{-7}$) | 98 | 91 | 116 | 93 |
| Resistance to water (ml) | 1.1 | 2.1 | 2.1 | 0.7 |
| Resistance to weathering | A | A | A | A |
| Temperature (°C.) for viscosity of 10$^4$ poises | 1099 | 1124 | 1046 | 1051 |
| Temperature (°C.) for viscosity of 10$^5$ poises | 967 | 990 | 911 | 912 |
| Temperature (°C.) for viscosity of 10$^6$ poises | 841 | 857 | 789 | 798 |
| Tendency toward crystallization (800° C., 15hr) | a | a | a | a |
| Tendency toward crystallization (1100° C., 15hr) | a | a | a | a |

| Composition and Properties | Example 15 | | Example 16 | |
|---|---|---|---|---|
| | Core glass | Cladding glass | Core glass | Cladding glass |
| SiO$_2$ (wt %) | 65 | 67.5 | 68.5 | 68.0 |
| GeO$_2$ (wt %) | — | — | — | — |
| Al$_2$O$_3$ (wt %) | 3 | 5 | 2 | 6.0 |
| Na$_2$O (wt %) | 10 | 7.5 | 15.2 | 7.4 |
| Li$_2$O (wt %) | 1 | 3 | 4.8 | 3.0 |
| K$_2$O (wt %) | 6 | 6.5 | — | 4.7 |
| CaO (wt %) | 6 | 4 | 6.7 | — |
| MgO (wt %) | 2 | — | 2.8 | 0.5 |
| B$_2$O$_3$ (wt %) | 7 | 1.5 | — | 8.4 |
| ZnO (wt %) | — | — | — | 2.0 |
| ZrO$_2$ (wt %) | — | 5.0 | — | — |
| TiO$_2$ (wt %) | — | — | — | — |
| Refractive index n | 1.5389 | 1.5183 | 1.5275 | 1.5144 |
| Thermal expansion coefficient ($\alpha \times 10^{-7}$) | 113 | 96 | 118 | 93 |
| Resistance to water (ml) | 1.7 | 1.0 | 24.1 | 1.0 |
| Resistance to weathering | A | AB | A | A |
| Temperature (°C.) for viscosity of 10$^4$ poises | 1069 | 1029 | 880 | 920 |
| Temperature (°C.) for viscosity of 10$^5$ poises | 921 | 886 | 771 | 820 |
| Temperature (°C.) for viscosity of 10$^6$ poises | 801 | 767 | 682 | 730 |
| Tendency toward crystallization (800° C., 15hr) | a | a | a | a |
| Tendency toward crystallization (1100° C., 15hr) | a | a | a | a |

| Composition and Properties | Example 17 | |
|---|---|---|
| | Core glass | Cladding glass |
| SiO$_2$ (wt %) | 59.5 | 68.0 |
| GeO$_2$ (wt %) | — | — |
| Al$_2$O$_3$ (wt %) | 2 | 6.0 |
| Na$_2$O (wt %) | 14.9 | 7.4 |
| Li$_2$O (wt %) | 2 | 3.0 |
| K$_2$O (wt %) | 2.7 | 4.7 |
| CaO (wt %) | 6.6 | — |
| MgO (wt %) | 2.5 | 0.5 |
| B$_2$O$_3$ (wt %) | 9.8 | 8.4 |
| ZnO (wt %) | — | 2.0 |
| ZrO$_2$ (wt %) | — | — |
| TiO$_2$ (wt %) | — | — |
| Refractive index n | 1.5358 | 1.5144 |
| Thermal expansion coefficient ($\alpha \times 10^{-7}$) | 110 | 93 |
| Resistance to water (ml) | 4.8 | 1.0 |
| Resistance to weathering | A | A |
| Temperature (°C.) for viscosity of 10$^4$ poises | 818 | 920 |
| Temperature (°C.) for viscosity of 10$^5$ poises | 741 | 820 |
| Temperature (°C.) for viscosity of 10$^6$ poises | 678 | 730 |
| Tendency toward crystallization (800° C., 15hr) | a | a |
| Tendency toward crystallization (1100° C., 15hr) | a | a |

| Composition and Properties | Control 1 | | Control 2 | |
|---|---|---|---|---|
| | Core glass | Cladding glass | Core glass | Cladding glass |
| SiO$_2$ (wt %) | 66.7 | 72.5 | 68.5 | 73 |
| GeO$_2$ (wt %) | 5 | — | — | — |
| Al$_2$O$_3$ (wt %) | 0.3 | 5 | 2 | 3 |
| Na$_2$O (wt %) | 5 | 7.5 | 15.2 | 17 |
| Li$_2$O (wt %) | 3 | 1 | 4.8 | 3 |
| K$_2$O (wt %) | 4 | 7 | — | — |
| CaO (wt %) | 3 | 4 | 6.7 | 3 |
| MgO (wt %) | 1 | 3 | 2.8 | 1 |
| B$_2$O$_3$ (wt %) | 12 | — | — | — |
| ZnO (wt %) | — | — | — | — |
| ZrO$_2$ (wt %) | — | — | — | — |
| TiO$_2$ (wt %) | — | — | — | — |
| Refractive index n | 1.5324 | 1.5101 | 1.5275 | 1.5121 |
| Thermal expansion coefficient ($\alpha \times 10^{-7}$) | 96 | 95 | 118 | 111 |
| Resistance to water (ml) | 0.9 | 3.8 | 24.1 | 18.4 |
| Resistance to weathering | A | A | A | A |
| Temperature (°C.) for viscosity of 10$^4$ poises | 1109 | 1075 | 880 | 850 |
| Temperature (°C.) for viscosity of 10$^5$ poises | 968 | 931 | 771 | 761 |
| Temperature (°C.) for viscosity of 10$^6$ poises | 854 | 820 | 682 | 680 |
| Tendency toward crystallization (800° C., 15hr) | b | a | a | a |
| Tendency toward crystallization (1100° C., 15hr) | b | a | a | a |

As mentioned above, the optical fiber of this invention prepared from multicomponent glass, particularly, the cladding glass member thereof gives rise to very little exudation of alkali metal, and consequently has a high resistance to chemicals such as resistance to water and a high resistance to weathering. In contrast, Control 2 in which the cladding glass contains an unduly large amount of an alkali metal oxide was proved to have a lower resistance to water than the optical fiber of this invention. Further, this invention prevents glass from crystallization during fibrous drawing, and provides with a high reproducibility an optical fiber which has a prominent dimensional stability, is free from the occurrence of striae, and allows for easy fibrous drawing. In contrast, Control 1 which contains too little Al$_2$O$_3$ undesirably indicates a strong tendency toward crystallization. The optical fiber of the invention has as low a transmission loss of light as 5 to 10 dB/km with respect to light beams having a wavelength of 850 millimicrons. Further, with the product of the invention, the core glass has a thermal expansion coefficient larger than that of the gladding glass by a difference $\Delta\alpha$ of less than $3\times10^{-6}$ cm/cm.° C. (at 0° to 300° C.). The core glass of the present optical fiber has a refractive index ($n_1$) larger than that of the cladding glass ($n_2$) by a larger ratio $\Delta n$ ($=n_1-n_2/n_1$) than 0.003. The optical fiber of the invention having the above-mentioned excellent properties displays a high reliability and prominent practical effect.

What we claim is:

1. An optical fiber consisting of a core glass member prepared from 55 to 70% by weight of $SiO_2$, 1 to 6% by weight of $Al_2O_3$, 14 to 21% by weight of an alkali metal oxide, 2 to 8% by weight of CaO, 1 to 4% by weight of MgO and 3 to 12% by weight of $B_2O_3$; and a cladding glass member formed of 65 to 75% by weight of $SiO_2$, 2 to 8% by weight of $Al_2O_3$, 9 to 16% by weight of an alkali metal oxide, 0 to 5% by weight of CaO, 0 to 3% by weight of MgO, 1 to 12% by weight of $B_2O_3$, and 0.5 to 3% by weight of at least one component selected from the group consisting of ZnO, $ZrO_2$ and $TiO_2$.

2. The optical fiber according to claim 1, wherein part of $SiO_2$ in the core glass member is replaced by up to 30% by weight of $GeO_2$.

3. The optical fiber according to claim 2, wherein the alkali metal oxide is at least one component selected from the group consisting of $Na_2O$, $K_2O$ and $Li_2O$.

* * * * *